(12) United States Patent
Maffey et al.

(10) Patent No.: US 7,306,254 B2
(45) Date of Patent: Dec. 11, 2007

(54) TRAILER KINGPIN LOCKING DEVICE

(75) Inventors: Daniel J. Maffey, Olny, MD (US); Constant O. Maffey, Carlisle, PA (US)

(73) Assignee: Dickey Manufacturing Company, St. Charles, IL (US)

( * ) Notice: Subject to any disclaimer, the term of this patent is extended or adjusted under 35 U.S.C. 154(b) by 170 days.

(21) Appl. No.: 11/195,507

(22) Filed: Aug. 2, 2005

(65) Prior Publication Data

US 2007/0029758 A1 Feb. 8, 2007

(51) Int. Cl.
*B60D 1/60* (2006.01)
*E05B 73/00* (2006.01)

(52) U.S. Cl. .......................... 280/507; 280/432; 70/14; 70/58

(58) Field of Classification Search ................ 280/507, 280/432; 70/14, 58
See application file for complete search history.

(56) References Cited

U.S. PATENT DOCUMENTS

| 2,755,655 | A | | 7/1956 | Maffey |
| 3,386,274 | A | * | 6/1968 | McIntyre .................... 70/232 |
| 3,600,914 | A | | 8/1971 | Johnson |
| 4,031,727 | A | | 6/1977 | De Groat |
| 4,132,093 | A | * | 1/1979 | McDorman, Sr. ............ 70/231 |
| 4,141,233 | A | | 2/1979 | Reyes |
| 4,305,266 | A | | 12/1981 | Lockwood |
| 4,553,415 | A | | 11/1985 | Maffey |
| 4,620,718 | A | | 11/1986 | Mickelson |
| 4,697,444 | A | * | 10/1987 | Maffey ........................ 70/232 |
| 4,704,883 | A | | 11/1987 | Dykes |
| 4,841,756 | A | | 6/1989 | Curtis |
| 4,882,921 | A | | 11/1989 | Wopinski |
| 5,136,863 | A | | 8/1992 | Richardson |
| 5,154,458 | A | | 10/1992 | Cook |
| 5,165,265 | A | | 11/1992 | Maionchi |
| 5,259,223 | A | | 11/1993 | Nee |
| 5,322,316 | A | | 6/1994 | Wheeler |
| 5,351,511 | A | | 10/1994 | Bernier |
| 5,491,992 | A | | 2/1996 | Mandall |
| 5,520,030 | A | | 5/1996 | Muldoon |
| 5,675,997 | A | | 10/1997 | Hulak |
| 5,987,938 | A | | 11/1999 | Frei |
| 6,070,688 | A | | 6/2000 | Schulz |
| 6,412,313 | B1 | | 7/2002 | Bernstrom |
| 6,427,496 | B1 | | 8/2002 | Hurst |
| 6,588,239 | B1 | | 7/2003 | Johansson |
| 6,761,050 | B2 | | 7/2004 | Rosenberg |
| 6,848,282 | B2 | * | 2/2005 | Palzkill et al. ................. 70/14 |

OTHER PUBLICATIONS www.universalboot.com.

* cited by examiner

*Primary Examiner*—Lesley D. Morris
*Assistant Examiner*—Marlon Arce-Diaz
(74) *Attorney, Agent, or Firm*—Barnes & Thornburg LLP

(57) ABSTRACT

A security device is disclosed which mounts to a king pin of a trailer to prevent unauthorized coupling of the trailer to a tractor. The security device includes a austempered ductile iron dual shell body having an inner shell for receiving a trailer kingpin and an outer conical or contoured shell to prevent unauthorized coupling to the trailer kingpin. The security device further includes a stainless steel collar placed between the inner and outer shells for deterring damage.

13 Claims, 12 Drawing Sheets

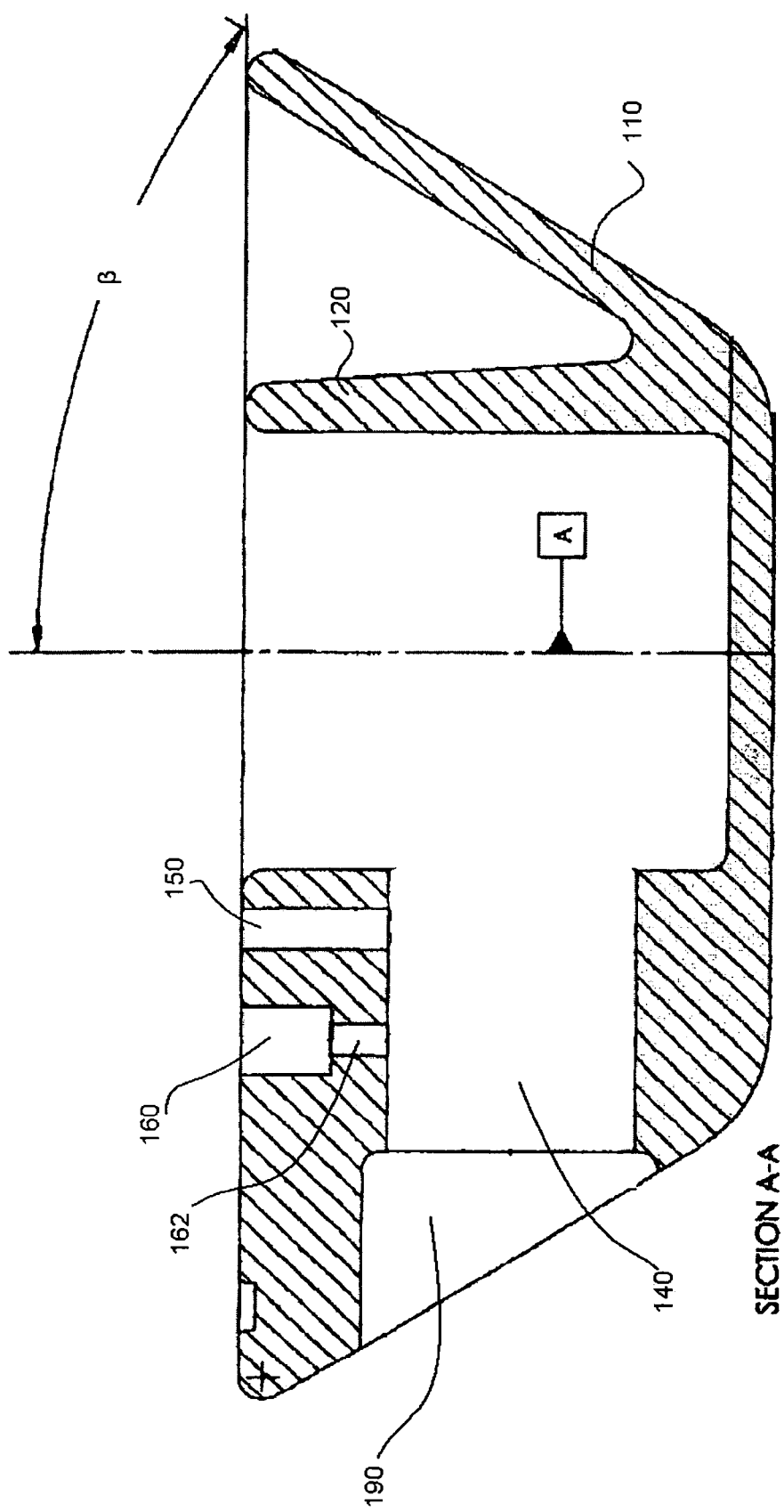

SECTION A-A

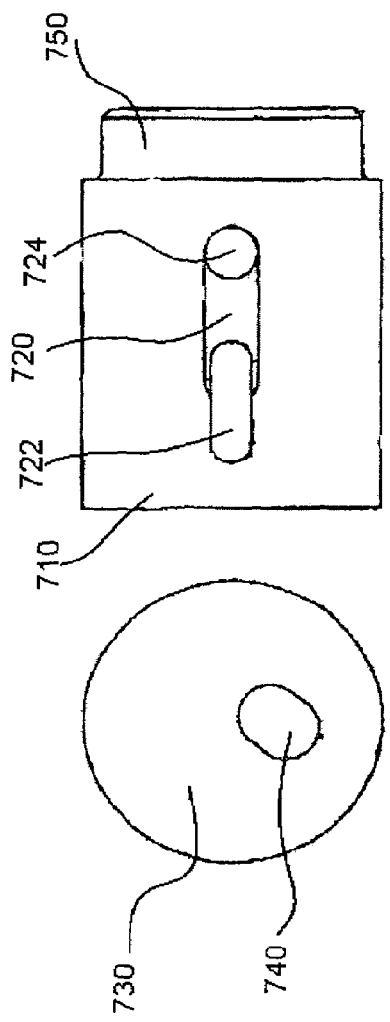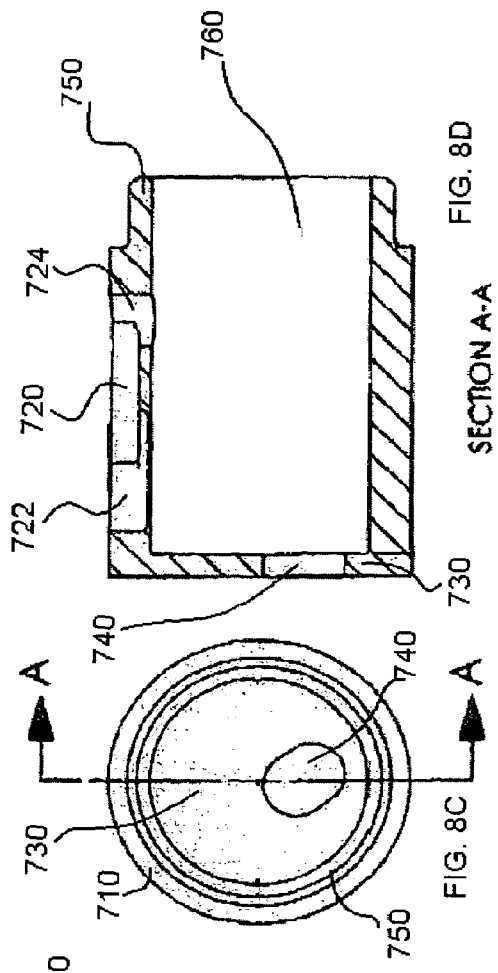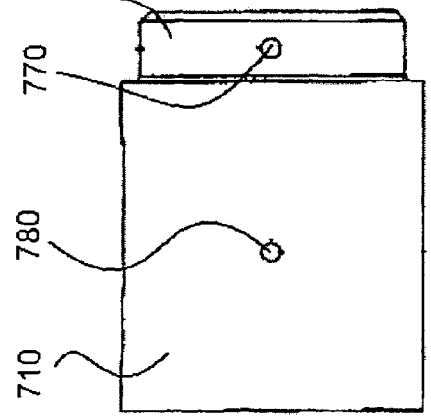

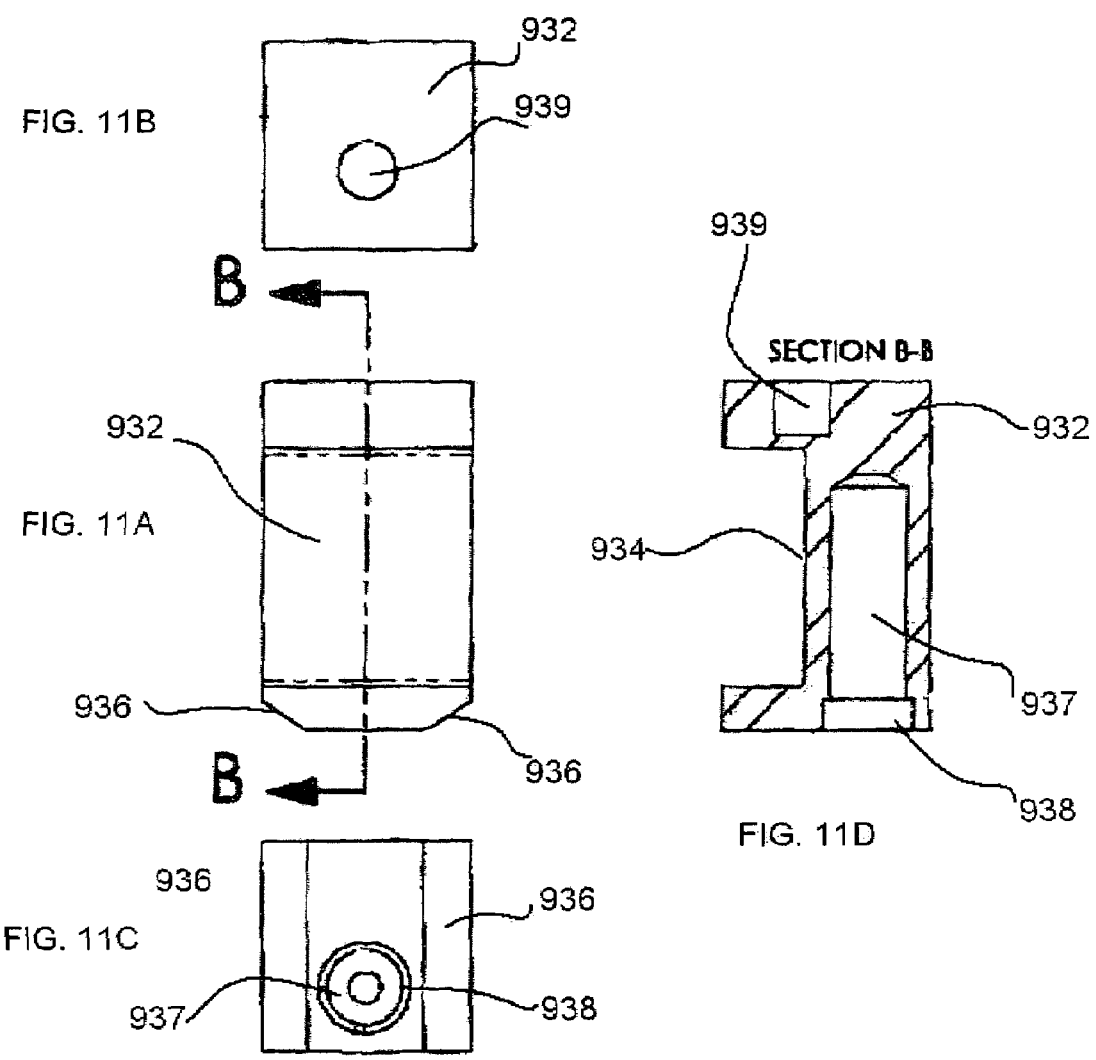

TRAILER KINGPIN LOCKING DEVICE

BACKGROUND OF THE INVENTION

1. Field of the Invention

The present invention relates to a security device for preventing unauthorized use of a trailer of other vehicle, such as an RV, having a coupling pin to couple the trailer to a tractor or other vehicle.

2. Brief Description of the Related Art

Coupling devices for coupling a trailer to a tractor or other vehicle typically include a coupling pin attached to the front of the trailer and a complementary receptacle attached to the rear of the tractor or truck which releasably engages the trailer coupling pin while allowing relative pivoting of the trailer and the tractor. A coupling device in wide use today comprises a pin referred to as a king pin extending from the front of trailers and a complimentary skid plate receptacle or fifth wheel mounted to the rear of tractors. The king pin and skid plate are standardized so that any trailer having a king pin may be coupled to any tractor having a complementary skid plate.

Frequently, trailers are uncoupled from tractors, for example, during loading and unloading, for storing trailers when they are not being moved, or for using tractors independently of trailers, and left unattended. In such instances, an unauthorized person with a tractor having a complementary skid plate for the trailer king pin may simply couple to the trailer, connect the air hoses to release the trailer air brakes and haul the trailer away.

To prevent unauthorized use of trailers having a coupling pin, security devices are known which are secured to the trailer coupling pin so as to prevent coupling of the trailer coupling pin to a complementary receptacle on a tractor. Such security devices include a locking device by means of which the security device is locked to the trailer coupling pin. Security devices of that type are described in prior U.S. Pat. Nos. 4,697,444 and 4,553,415 to one of the inventors of the present invention. Although these devices performed satisfactorily in many circumstances, they could still be defeated through a variety of means, such as by drilling, by the application of heat, or by modifying a tractor skid plate to attached to the lock rather than to the trailer kingpin.

The present invention overcomes these shortcomings by significantly increasing the difficulty of defeating the lock by means of drilling, flame cutting, smashing, or modifying a skid plate to attach to a kingpin with a lock attached thereto.

SUMMARY OF THE INVENTION

A preferred embodiment of the present invention is a locking device for a coupling pin comprising a lock body having an inner wall, an outer wall, and a bore hole through the inner and outer walls, the inner wall defining a space for receiving a trailer kingpin and the outer wall being inclined from lower portion toward an upper portion; a lock collar between the inner wall and the outer wall; a locking bar in the bore hole, the locking bar having a cavity therein, the cavity having a first opening at one end for receiving a lock mechanism and a second opening smaller than the first opening at a second end, the second end of the locking bar being closer to the outer wall than the first end of the locking bar; and a lock mechanism in the cavity in the locking bar.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which:

FIG. 2B is a cross-section view of a lock body in accordance with an embodiment of the invention.

FIGS. 8A-E are side, side, top, cross-section, and bottom views, respectively, of a locking bar of an alternative embodiment of the invention.

FIGS. 11A-D are side, top, bottom, and cross-section views of a locking bolt in accordance with an embodiment of the invention.

DETAILED DESCRIPTION OF THE PREFERRED EMOBODIMENTS

Figure 1:
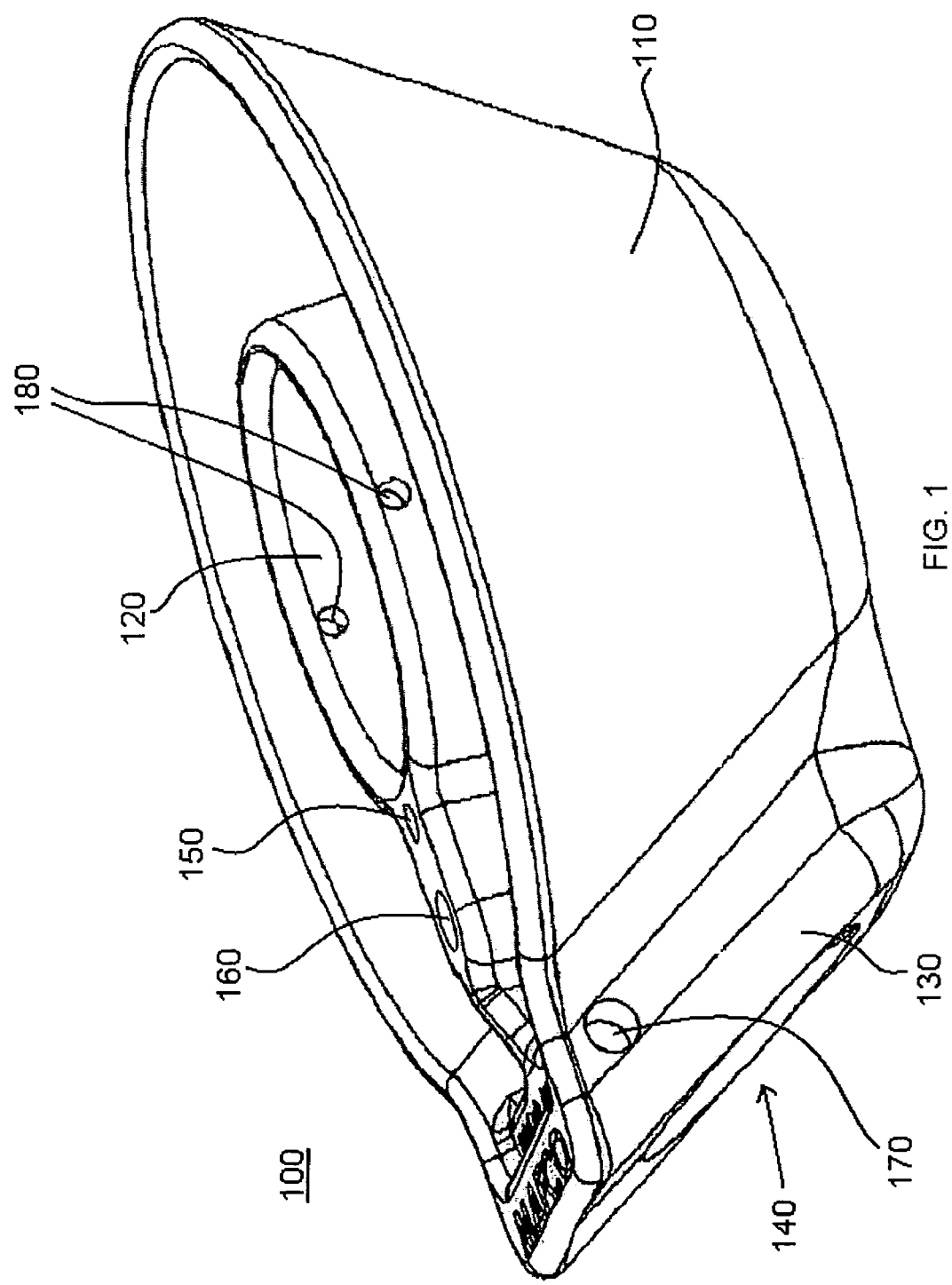
FIG. 1 is a perspective view of a lock body in accordance with an embodiment of the present invention.
Figure 2A:
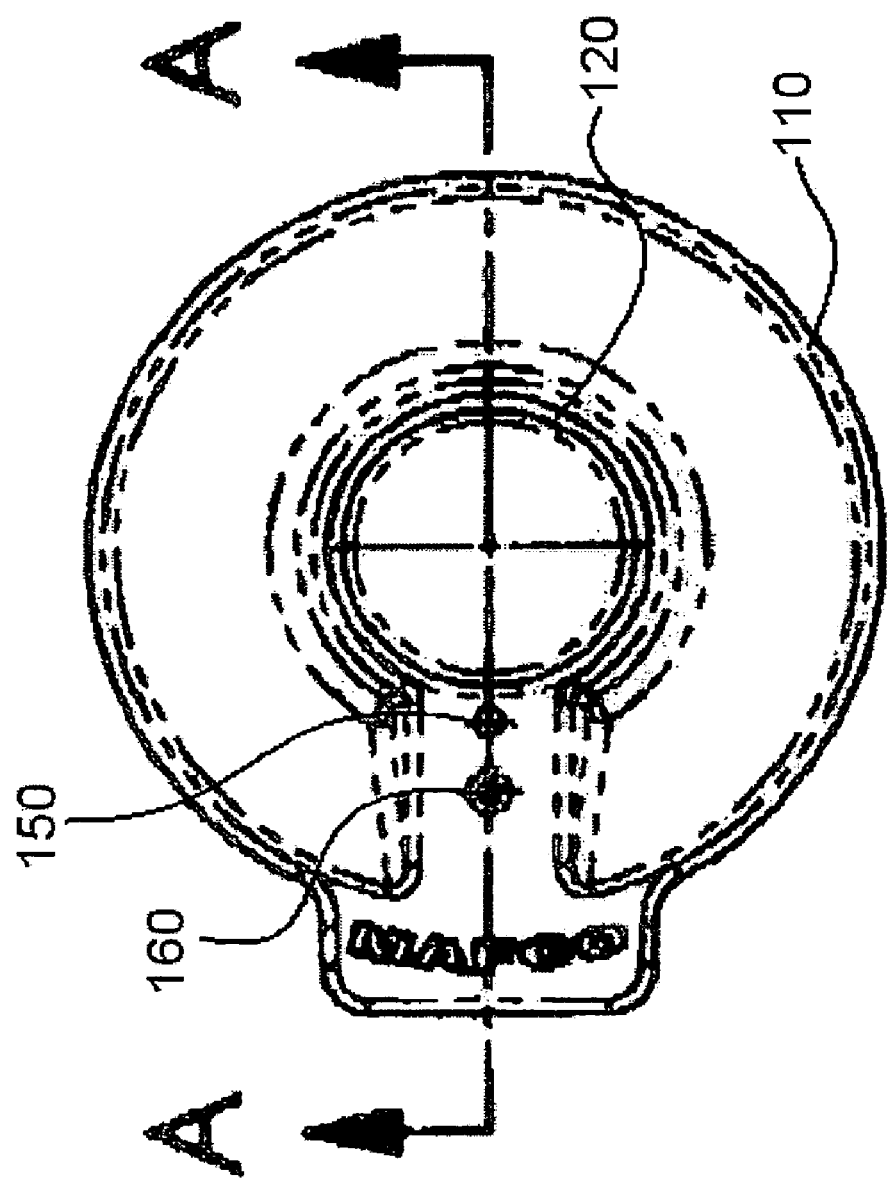
FIG. 2A a top view of a lock body in accordance with an embodiment of the present invention.

The present invention incorporates a variety of components that may be used together, or in some instances separately, as a king pin security lock. A kingpin lock body will be described with reference to FIGS. 1 and 2A-B.

The lock body 100 has an inner shell 120 having an opening or cavity for receiving a trailer kingpin. In this embodiment, the inner shell 120 is predominantly cylindrical, but it may take on a variety of other shapes including but not limited to being slightly conical. The lock body 100 further has an outer shell 110 connected to the inner shell 120, the outer shell 110 being partially conical in shape with the circumference of the bottom edge of the outer shell being less than the circumference of the upper edge of the outer shell. The slope of the conical portion of the outer shell 120, as defined by angle β, is preferably between 10 and 80 degrees, and most preferable, is approximately 33.5 degrees.

The lock body 100 of this embodiment further has a neck 130 having a bore hole 140 therein. In this preferred embodiment, the lock body 100 is cast from ductile iron.

After casting, handle holes 170 are drilled in the neck for securing a handle for carrying the lock. Collar holes 180 are drilled and tapped for securing a collar to the lock body. Additionally, through hole 150 is drilled and hole 160,162 is drilled and tapped in the lock body. Hole 162 is threaded for receiving an alien screw. After all drilling and smoothing of surfaces, including bore hole 140, 190, the lock body 100 is austempered to harden the ductile iron.

Figure 3:
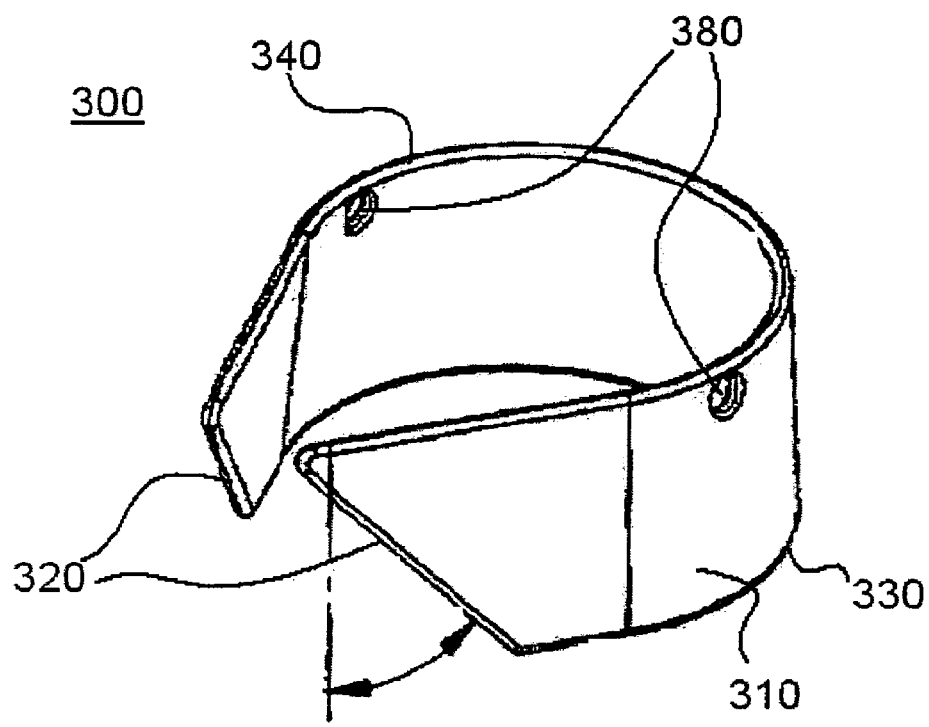
FIG. 3 is a perspective view of a lock collar in accordance with an embodiment of the invention.

A stainless steel collar 300 is formed as shown in FIG. 3 to fit between the inner shell 120 and the outer shell 110 of the lock body 100. The collar 300 has a collar body 310 having a lower edge 330, an upper edge 340, and angled ends 320. In a preferred embodiment, the collar body is slightly conical with the circumference of a circle partially formed by edge 330 being slightly larger than a circle partially formed by edge 340. The collar may be formed in other shapes, such as partially cylindrical. Holes 380 are drilled in the collar for receiving screws to mount the collar 300 to the inner shell 120 of the lock body 100. When the lock is in use with the collar in place, the collar improves the lock's resistance to tampering by way of applying heat because the collar at least partially shields the inner shell 120 of the lock body 100 from heat applied to the lock.

Figure 4:
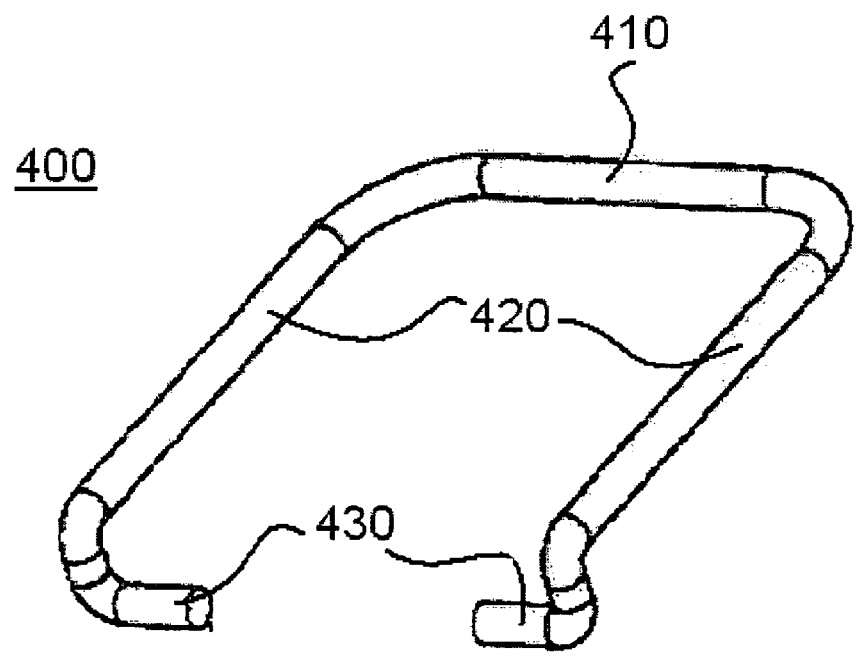
FIG. 4 is a perspective view of a lock handle in accordance with an embodiment of the invention.
Figure 5A:
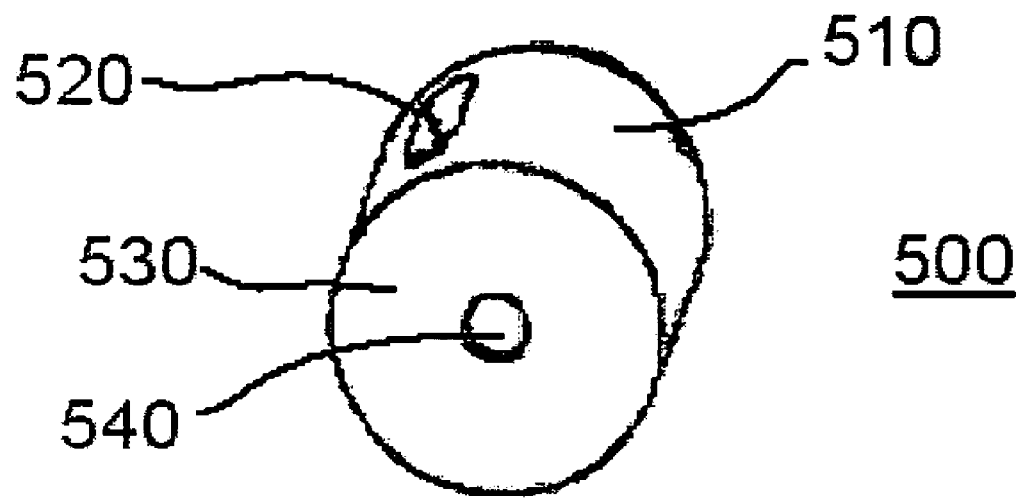
FIGS. 5A and 5B are perspective views of a locking bar in accordance with an embodiment of the invention.
Figure 5B:
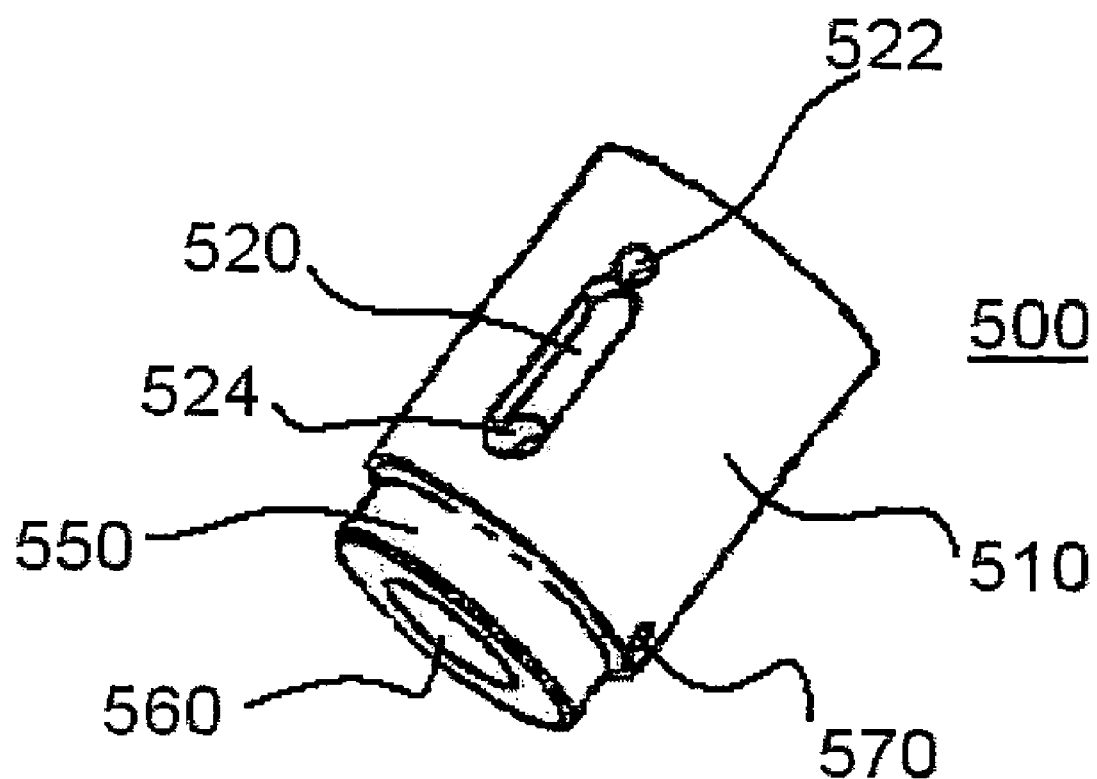
Figure 6A:
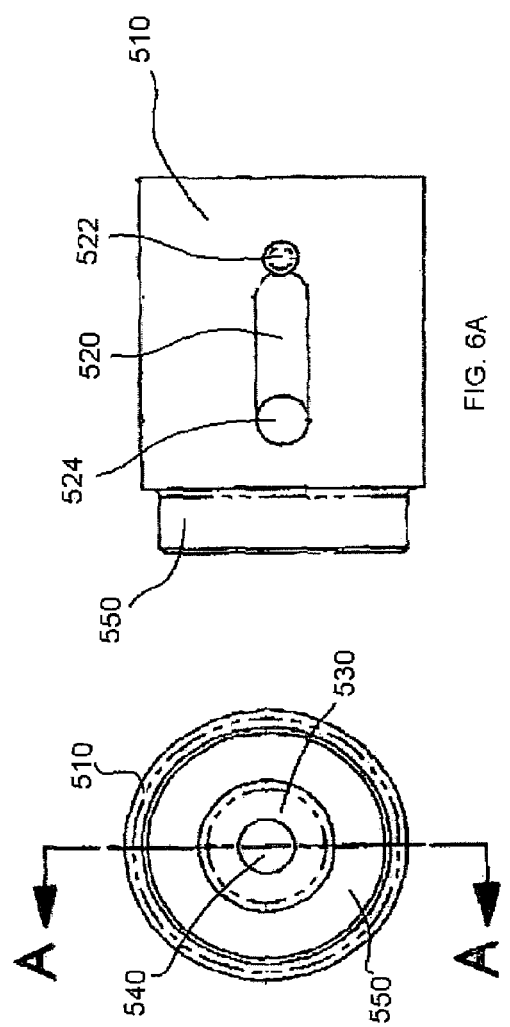
FIGS. 6A-E are side, top, cross-section, side, and bottom views, respectively, of a locking bar in accordance with an embodiment of the invention.
Figure 6E:
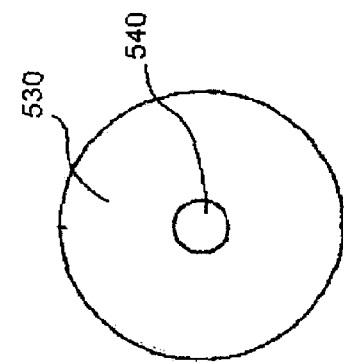
Figure 6D:
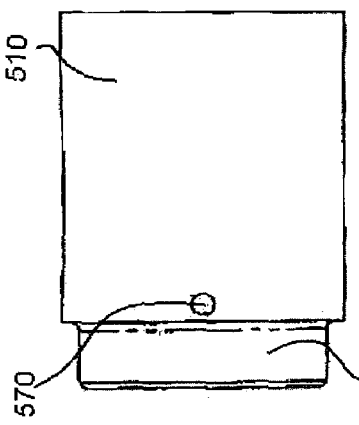
Figure 6B:
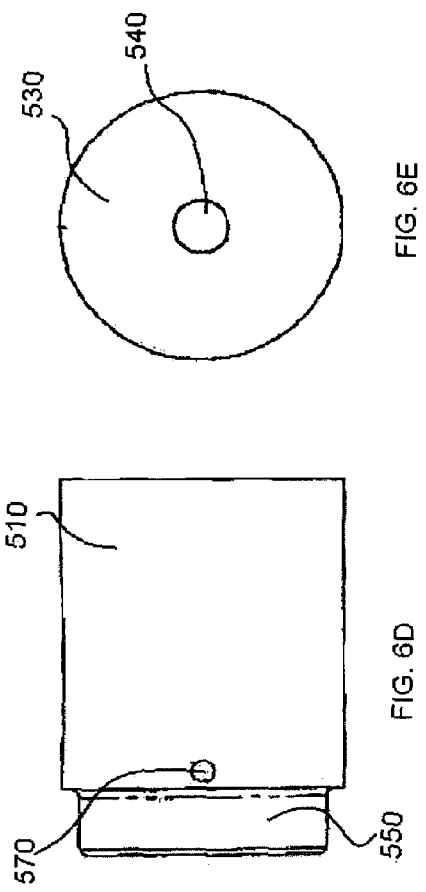
Figure 6C:
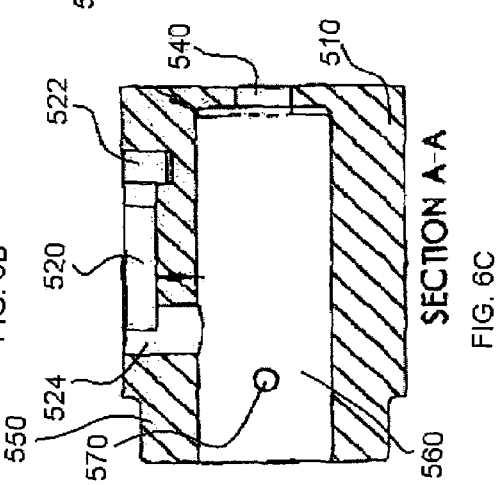
Figure 7:
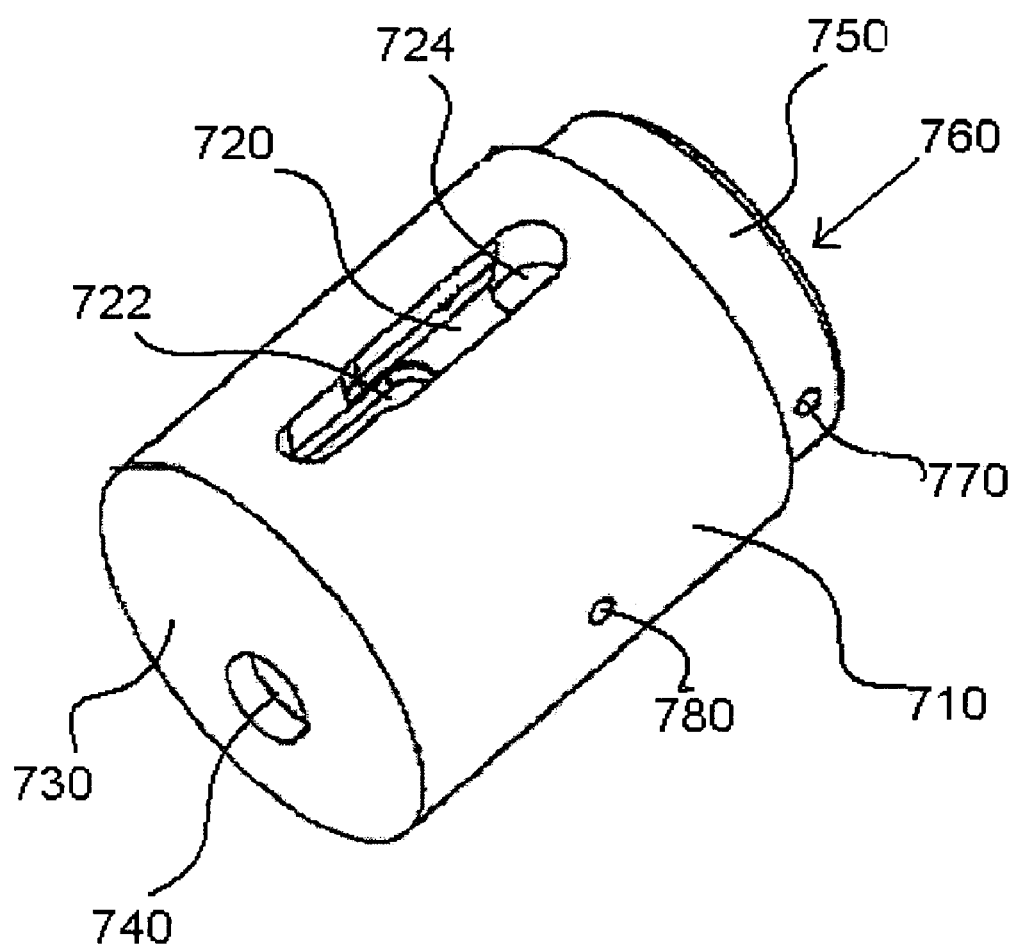
FIG. 7 is a perspective view of a locking bar in accordance with an alternative embodiment of the invention.
Figure 9A:
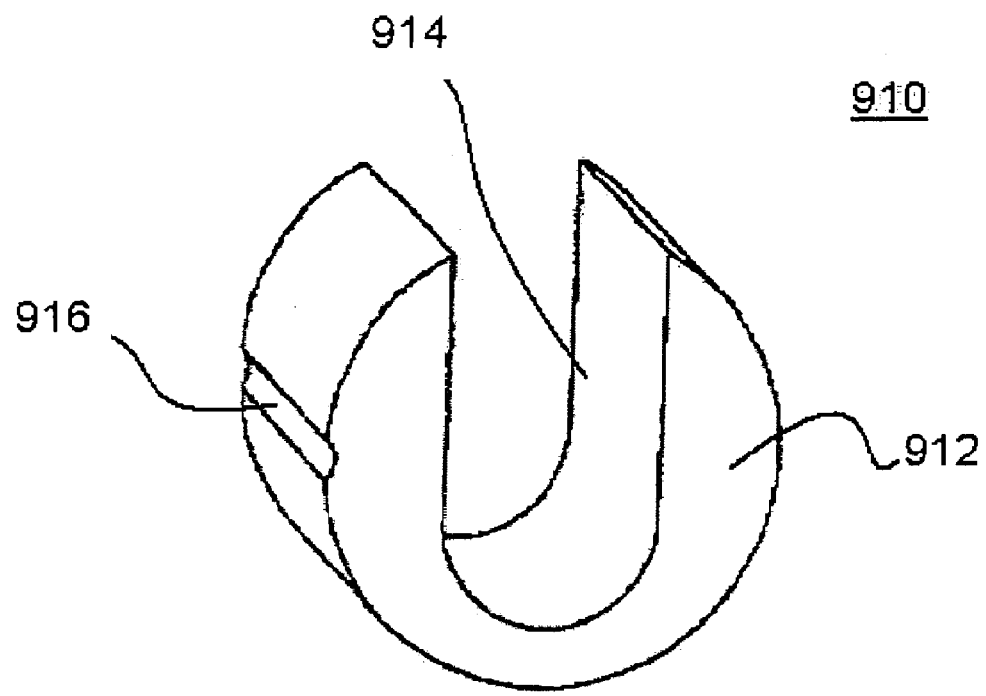
FIG. 9A is a perspective view of a centering spacer in accordance with an embodiment of the present invention.
Figure 9B:
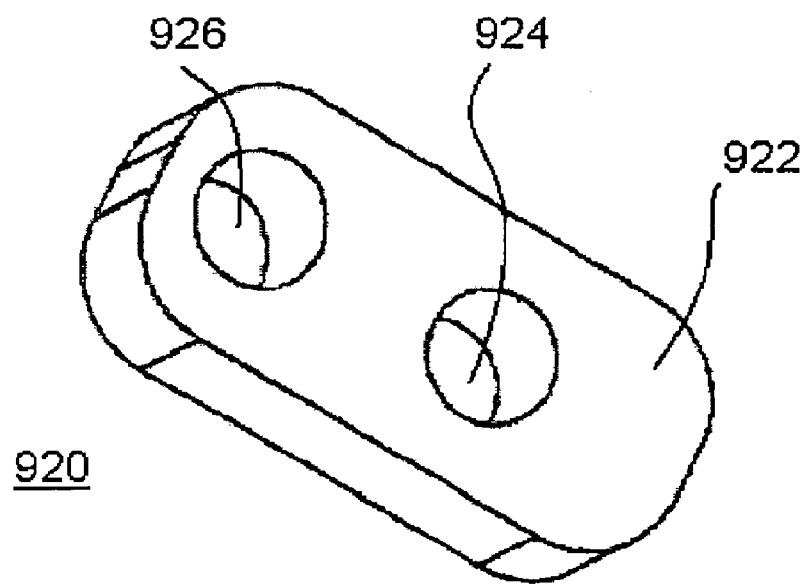
FIG. 9B is a perspective view of a lock cam in accordance with an embodiment of the present invention.
Figure 10A:
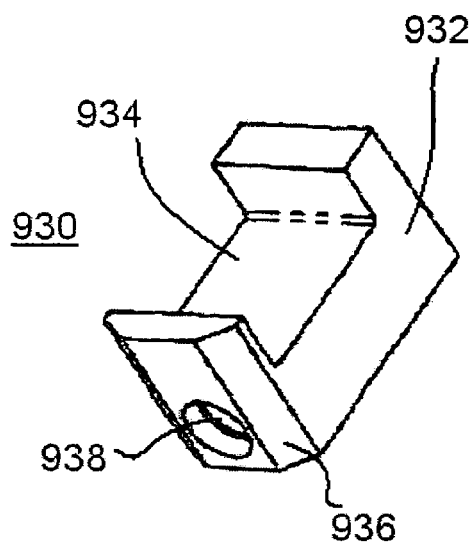
FIGS. 10A-B are perspective views of a locking bolt in accordance with an embodiment of the present invention.
Figure 10B:
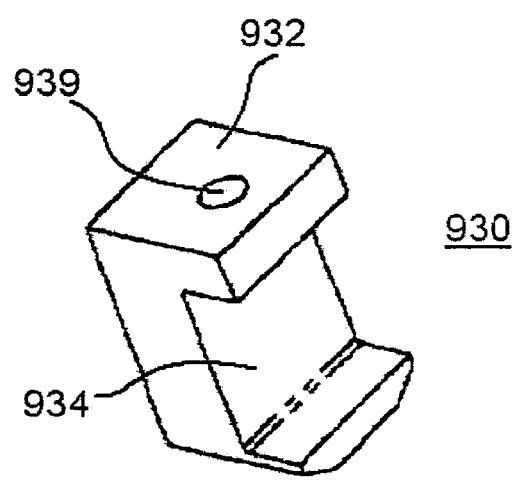

FIG. 4 illustrates a handle of an embodiment of the invention to be connected to the lock body 100 via holes 170. The handle of a preferred embodiment has a grip portion 410, arm portions 420, and mounting portions 430. Other structures for a handle and other means of attaching a handle, such as a by one or more bolts, screws, washers ,nuts, and the like, may be used.

The bore hole 140 of the lock body 100 receiving a locking bar that may house any of a variety of types of locks. The locking bars of the present invention are designed to be back-loading so as to protect the lock mechanism from tampering. An embodiment of a locking bar for housing a cylindrical lock such as an ABLOY T-handle spring loaded lock is described with reference to FIGS. 5A-B and 6A-E. The locking bar preferably is stainless steel and is heat treated to increase hardness after all drilling is completed. The locking bar 500 has a cylindrical body 510 having a narrowed portion 550 at an inner end (the "inner end" being the end that will be nearer the interior of the lock body when the lock is assembled) and a cavity, bore or the like, 560 in its interior. An outer end 530 of the locking bar 500 is predominantly enclosed, having only a hole 540 therein for receiving a key. The hole 540 is placed to properly accommodate a key to be inserted into a locking mechanism or lock core placed in the cavity 560 of the locking bar.

A travel slot 520 is machined into the top of the locking bar. When the locking bar 500 is placed into the lock body 100, means such as a shoulder screw is inserted through hole 160 in the lock body 100 into the travel slot 520, thereby securing the locking bar 500 to the lock body 100 in a manner in which the locking bar 500 can move slightly in an out of the lock body 100. When the lock body 100 is placed over a coupling pin, the locking bar is moved (pushed) into the lock body to the interior of inner shell 120 to lock the lock body onto the coupling pin (not shown) on the trailer or other vehicle.

At a rotational position on the locking bar displaced from the travel slot, a hole 570 for receiving a roll-pin (not shown) is drilled in the locking bar. The roll-pin prevents the cylindrical lock core, such as the Abloy lock, from rotating within the locking bar.

Likewise, holes 522 and 524 are drilled at the ends of the travel slot. Hole 524 receives a locking bolt (not shown) extending from the lock core. The locking bolt must be long enough that in the locked position it extends through hole 524 in the locking bar and into hole 150 in the lock body and short enough that in the unlocked position it does not protrude into hole 150 in the lock body. A spring (not shown) is placed between hole 522 and the shoulder screw (not shown) that extends into the travel slot. The spring is positioned in a direction parallel to the travel slot 520 and biases the shoulder screw in the travel slot 520 toward the end of travel slot 520 nearest to hole 524. The spring effectively biases the locking bar in an unlocked position. In a preferred embodiment, two hardened stainless steel balls (not shown) are placed in the spring to deter drilling through the spring.

When in use, the lock body 100 is placed over the coupling pin of the vehicle to be locked, the locking bar is pushed into bore hole 140 in the lock body 100. When the locking bar is pushed into the lock body 100, the spring loaded locking bolt in the lock core extends into hole 150 in the lock body thereby locking the locking bar 500 into place. When the key is inserted into the lock core (through hole 540 in the locking bar 500) and is turned, the locking bolt is retracted out of hole 150 thereby allowing the locking bar 100 to slide slightly out of the bore hole 140 in the lock body and permitting removal of the locking device from the coupling pin.

An alternative embodiment of a stainless steel locking bar for housing a non-cylindrical lock such as an interchangeable lock core, or Best-style lock, is described with reference to FIGS. 7 and 8A-E. The locking bar may be heat treated to increase hardness after all drilling is completed. The locking bar 700 has a stainless steel cylindrical body 710 having a narrowed portion 750 at an inner end (the "inner end" being the end that will be nearer the interior of the lock body when the lock is assembled) and a cavity, bore or the like, 760 in its interior. An outer end 730 of the locking bar 700 is predominantly enclosed, having only a key-hole 740 therein. The key hole 740 is placed to off-center to accommodate a key to be inserted into a non-cylindrical locking mechanism placed in the cavity 760 of the locking bar.

A travel slot 720 is machined into the top of the locking bar. When the locking bar 700 is placed into the lock body 100, means such as a shoulder screw is inserted through hole 160 in the lock body 100 into the travel slot 720, thereby securing the locking bar 700 to the lock body 100 in a manner in which the locking bar 700 can move slightly in an out of the lock body 100.

At a rotational position on the locking bar displaced from the travel slot, a hole 770 for receiving a screw (not shown) is drilled in the locking bar. The screw prevents the end plug from rotating within the locking bar. A second hole 780 additionally is drilled into a side of the locking bar for receiving a screw to prevent the spacer from rotating within the locking bar. Likewise, holes 722 and 724 are drilled at the ends of the travel slot.

As shown in FIGS. 9A-B, 10A-B, 11A-D, and 12A-C, this alternative lock bar embodiment further has a centering spacer 910, a lock cam 920, a locking bolt 930, and an end plug 940 to translate the movement of the interchangeable lock core to a vertical direction to effectuate locking of the kingpin lock of the present invention. The centering spacer 910 has a body 912 having a slot 914 and a groove 916 therein. The centering spacer in a preferred embodiment is formed from steel barstock, but it could be made from any of many different materials. The centering spacer 910 is placed inside the cavity 760 of the locking bar 700 with the opening of the slot 914 facing upward. The centering spacer 910 houses the interchangeable lock core with interchangeable lock core being placed within the slot 914. When the spacer 910 is within the locking bar 700, a screw is placed in hole 780 in the locking bar 700 and into groove 916 for preventing rotation of the spacer 910 within the locking bar 700.

The lock cam 920 has a body 922 and holes 924 and 926 drilled therein. Hole 926 is substantially offset from center toward one end of the lock cam 920 while hole 924 is slightly offset from center toward the opposite end of the lock cam 920. The placement of the holes 924, 926 of the lock cam 920 may vary depending on the type of lock mechanism used in the invention. The lock cam 920 is preferably formed from steel barstock but may be formed from other materials. The lock cam 920 is connected to the interchangeable lock core via pins (not shown) connecting the Best Lock mechanism to holes 924, 926 in the lock cam 920. In this manner, the lock cam 920 translates the movement of the interchangeable lock core to a vertical movement by moving a locking bolt 930, shown in FIGS. 10A-B, up and down.

The locking bolt 930 of a preferred embodiment has a body 932 having a groove, slot or indentation 934 therein for accommodating the lock cam body 922. The locking bolt body 932 is preferably formed from steel barstock or other material. At one end, the lock bolt body 932 has contoured edges 936 and a dimple 938. The dimple 938 has a cavity 937 therein for housing a spring (not shown). The opposing end has a threaded hole 939 for receiving means such as an allen screw (not shown).

Figure 12C:
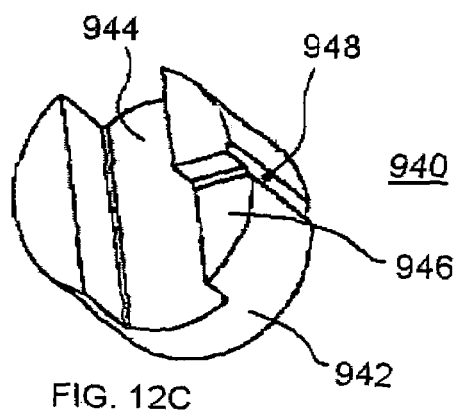
FIGS. 12A-C are perspective views of an end plug in accordance with an embodiment of the invention.
Figure 12A:
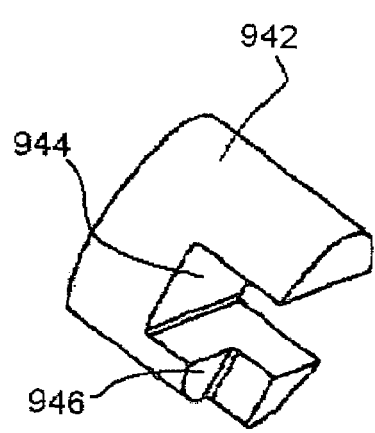
Figure 12B:
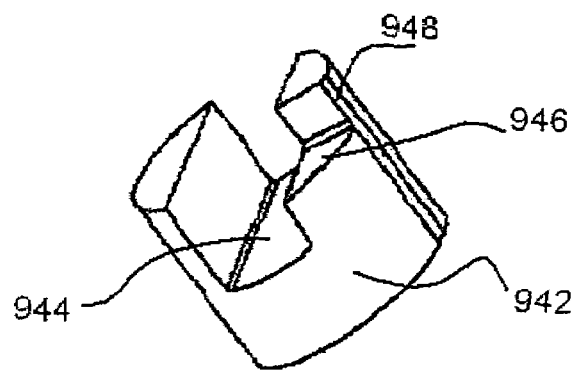

An end plug 940 in accordance with this embodiment of the invention is shown in FIGS. 12A-C. The end plug 940 is cylindrical in shape and fits into the opening of cavity 760 in the locking bar 700. The end plug 940 has a cylindrical body 942 and three slots 944, 946, and 948 therein.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claimed:

1. A locking device for use in connection with a trailer kingpin comprising:
    a lock body having an inner wall, an outer wall, and a bore hole through said inner and outer walls, said inner wall defining a space for receiving a trailer kingpin and said outer wall being inclined from lower portion toward an upper portion;
    a lock collar between said inner wall and said outer wall;
    a locking bar in said bore hole, said locking bar having a cavity therein, said cavity having a first opening at one end for receiving a lock mechanism and a second opening smaller than said first opening at a second end, said second end of said locking bar being closer to said outer wall than said first end of said locking bar; and a lock mechanism in said cavity in said locking bar;
    wherein said lock body further comprises a neck connected to said inner and outer walls.

2. A locking device according to claim 1, wherein said trailer kingpin is formed and arranged in operative association with a recreational vehicle.

3. A locking device according to claim 1, wherein said lock mechanism comprises a cylindrical lock.

4. A locking device according to claim 1, wherein said lock mechanism comprises a spring-loaded latch lock.

5. A locking device according to claim 1, wherein said locking bar is cylindrical.

6. A locking device according to claim 1, wherein said outer wall of said lock body is at least partially conical in shape.

7. A locking device according to claim 1, wherein an angle of inclination of said outer wall of said lock body is approximately 33.5 degrees.

8. A locking device for use in connection with a coupling pin comprising:
    a lock body comprising an inner shell for receiving said coupling pin, an outer shell connected to and inclined with respect to said inner shell, and a bore hole through said inner and outer shells;
    a locking bar in said bore hole, said locking bar comprising:
    a locking bar body having a cavity therein, said cavity having a first opening at one end of said locking bar body for receiving a lock mechanism and a second opening smaller than said first opening at a second end of said locking bar body, said second end of said locking bar being closer to said outer wall than said first end of said locking bar;
    and a lock core in said cavity in said locking bar;
    wherein said locking device further comprises a neck through which said bore hole passes.

9. A locking device according to claim 8, further comprising a collar between said inner and outer shells.

10. A locking device according to claim 8, wherein said lock body comprises austempered ductile iron.

11. A locking device according to claim 9, wherein said lock body comprises stainless steel.

12. A locking device according to claim 8, wherein said locking bar further comprises:
    a travel slot in said locking bar body.

13. A locking device according to claim 1, wherein said trailer kingpin is formed and arranged in operative association with a semitrailer.

* * * * *